US012730807B2

(12) United States Patent
Han et al.

(10) Patent No.: US 12,730,807 B2
(45) Date of Patent: Sep. 8, 2026

(54) NATURAL LANGUAGE CONVERSION TO SQL FOR COMPLEX SCENARIOS

(71) Applicant: International Business Machines Corporation, Armonk, NY (US)

(72) Inventors: Rui Han, Xi'An (CN); Yuan Yuan Ding, Shanghai (CN); Qi Liang Zhou, Xi'An (CN); Yong Wang, Xian (CN); Deng Xin Luo, Xian (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 19/008,743

(22) Filed: Jan. 3, 2025

(65) Prior Publication Data

US 2026/0195324 A1 Jul. 9, 2026

(51) Int. Cl.
*G06F 16/2452* (2019.01)
*G06F 16/22* (2019.01)
*G06F 16/2455* (2019.01)

(52) U.S. Cl.
CPC .... *G06F 16/24522* (2019.01); *G06F 16/2246* (2019.01); *G06F 16/2456* (2019.01)

(58) Field of Classification Search
CPC ........... G06F 16/24522; G06F 16/2246; G06F 16/2456
USPC .......................................................... 707/705
See application file for complete search history.

(56) References Cited

U.S. PATENT DOCUMENTS 10,380,213 B1 8/2019 Sanchez
10,430,407 B2 * 10/2019 Bhatt ................ G06F 16/24522
11,269,872 B1 * 3/2022 Moo ..................... G06F 16/243
11,798,529 B2 10/2023 Zhu et al.
2020/0034362 A1 * 1/2020 Galitsky ............... G06F 40/247
2020/0334233 A1 * 10/2020 Lee ........................ G06N 3/045
2020/0334252 A1 * 10/2020 Lee ...................... G06N 3/0455
(Continued)

FOREIGN PATENT DOCUMENTS

CN 112347121 A 2/2021
CN 116414865 A 7/2023
CN 116414961 A 7/2023
(Continued)

OTHER PUBLICATIONS

Lian et al., "ChatBI: Towards Natural Language to Complex Business Intelligence SQL", arXiv:2405.00527v1 , May 1, 2024, 12 pages.

(Continued)

*Primary Examiner* — Shahid A Alam
(74) *Attorney, Agent, or Firm* — Harrity & Harrity, LLP

(57) ABSTRACT

An example operation includes one or more of receiving a natural language input via a software application, executing a machine learning model on the natural language input to determine a plurality of sub-queries corresponding to the natural language input, searching a tree structure for field values that correspond to the plurality of sub-queries, relationships between the field values, and computations to be performed, generating a structured query language (SQL) command based on the field values, relationships between the field values, and the computations to be performed, and executing the SQL command on a database to generate query results and return the query results to the software application.

20 Claims, 12 Drawing Sheets

(56) References Cited

U.S. PATENT DOCUMENTS

| | | | | |
|---|---|---|---|---|
| 2022/0215622 | A1* | 7/2022 | Stevens | G06T 17/05 |
| 2024/0242154 | A1 | 7/2024 | Jindal et al. | |

FOREIGN PATENT DOCUMENTS

| | | | |
|---|---|---|---|
| CN | 116991875 | A | 11/2023 |
| CN | 117271557 | A | 12/2023 |
| CN | 117708162 | A | 3/2024 |
| CN | 117743371 | A | 3/2024 |

OTHER PUBLICATIONS

Yu et al., "Prompt-Based Monte-Carlo Tree Search for Goal-oriented Dialogue Policy Planning", Proceedings of the 2023 Conference on Empirical Methods in Natural Language Processing, Dec. 6-10, 2023, pp. 7101-7125.

* cited by examiner

200A

Host Platform 220
Software Application 221
223
Decompose
Sub-query
Search
NL Input 216
ML Model 222
Sub-query
Business Forest 224
Sub-query
225
Query Content
210
Modify
214
212
Refactoring 226
SQL Command 230
Computing System

300A

300C
Business Forest 340
345
341
Business Layer
Milestone
Order Change
Alerts
Suppliers
Order
Delivery
342
Dimension Layer
Calendar
Operation Division
Material
SBU
343
KPI Layer
Blocked Order Flag
Arrived Late Flag
Price Missing Flag
Ord. Update Flag
344
SQL Command Layer
CMD Statement
MCTS
350
Query Content 352
Alerts
SBU
Price Missing Flag
Blocked Order Flag
CMD Statement

400

NATURAL LANGUAGE CONVERSION TO SQL FOR COMPLEX SCENARIOS

BACKGROUND

Text-to-structured query language (SQL) can be applied to generative artificial intelligence and machine learning. For example, using large language models to convert natural language into an SQL command can achieve data retrieval, replacing the need for manual action. Furthermore, fine-tuning large language models can further the accuracy of the SQL command that is generated. However, in various scenarios, particularly when end-users are unfamiliar with the data source being queried, generating a correct SQL command using large language models can be very difficult and fine-tuning cannot solve the problem of lack of accuracy.

SUMMARY

One example embodiment provides a computer-implemented method that may include one or more of receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application.

Another example embodiment provides a computer system that may include a processor set, a set of one or more computer-readable storage media, and program instructions, collectively stored in the set of one or more storage media, that cause the processor set to perform computer operations that may include one or more of receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application.

A further example embodiment provides a computer program product that may include a set of one or more computer-readable storage media, and program instructions, collectively stored in the set of one or more computer-readable storage media, for causing a processor set to perform computer operations that may include one of more of receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application.

DETAILED DESCRIPTION

Figure 1:
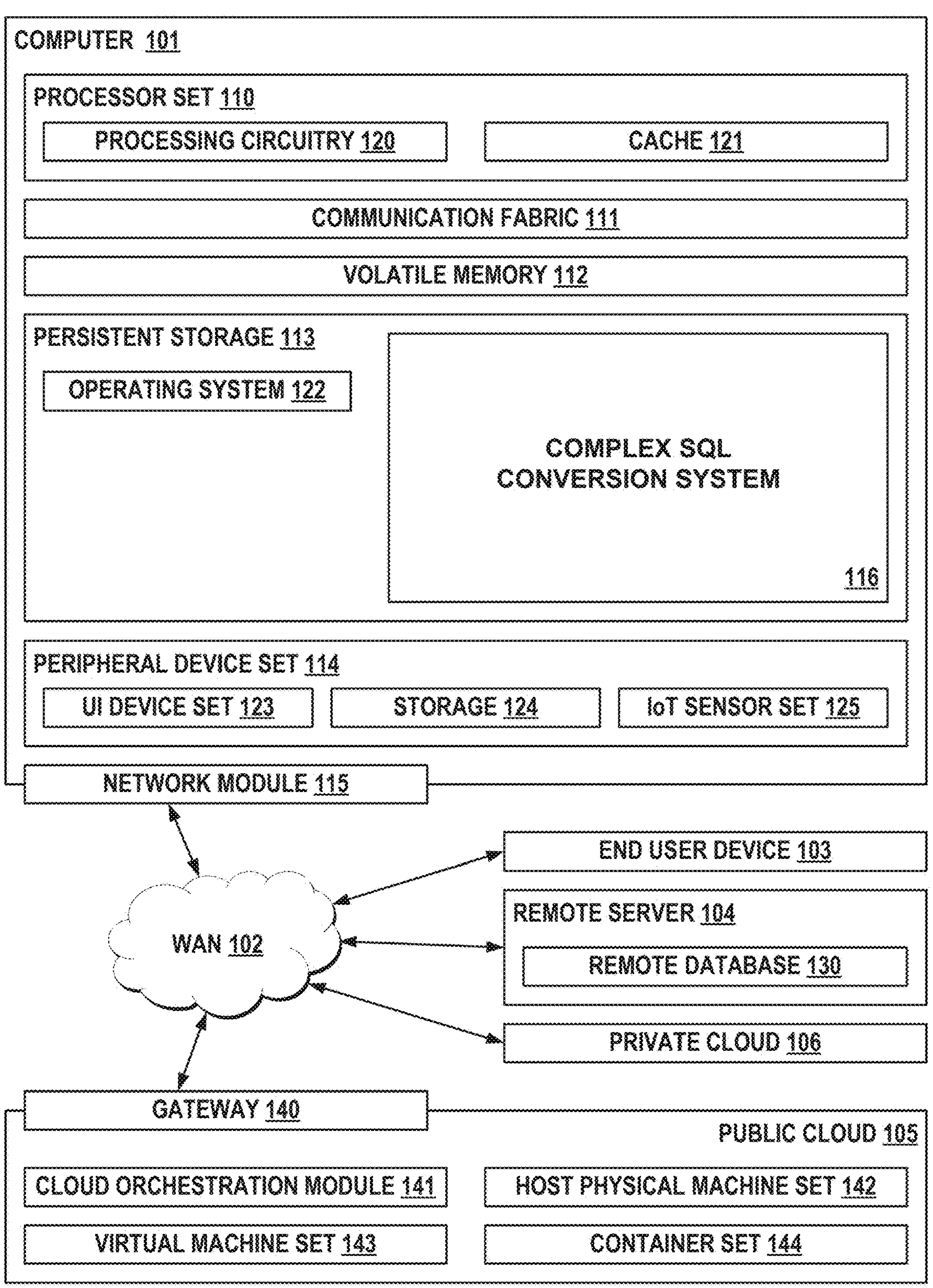
FIG. 1 is a diagram illustrating a computing environment according to an embodiment of the instant solution.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

According to an aspect of the example embodiments, there is provided a computer-implemented method that includes receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application. A technical advantage of the method is that the SQL command that is generated is highly accurate resulting in fewer errors and more accurate data retrieval when the SQL command is executed against the database.

In some embodiments, the computer-implemented method may further include determining hidden query content from the natural language input based on execution of the machine learning model and generating a sub-query which includes the hidden query content. The technical effect of this invention is identifying query content that is not specifically spoken by a user. The technical advantage of this feature is that the user does not need to have specific knowledge of the underlying schema of the database to have an accurate SQL command generated.

In some embodiments, the computer-implemented method may include searching a plurality of layers of the tree structure and identifying a plurality of query attributes for the SQL command, respectively, and the generating comprises generating the SQL command to include the plurality of query attributes. The technical advantage of this feature is identifying specific query attributes using a narrowly refined tree structure thereby improving the accuracy of the SQL command.

In some embodiments, the computer-implemented method may include executing a Monte Carlo Tree Search (MCTS) on the tree structure starting from a root node of the tree structure to decide a path in the tree structure which includes a child node that contains a greatest upper confidence bound. The technical advantage of this feature is using a search algorithm to perform a smart search of the tree structure which takes significantly less time than performing a generic search of the entire tree structure.

In some embodiments, the computer-implemented method may include identifying tables to be queried from the database and at least one join operation to be performed on the tables, from the tree structure. The technical advantage of this feature is that the tree structure can be used to identify query components such as table names, join operations, and the like, thereby alleviating a need for a human to identify these components.

In some embodiments, the computer-implemented method may include identifying an operation for the SQL command including at least one of an aggregate function, a Boolean function, and a numeric calculation, and column identifiers for the operation, from the tree structure. The technical advantage of this feature is that the tree structure can be used to identify numerical functions with an SQL query thereby alleviating a need for a human to identify these functions.

In some embodiments, the computer-implemented method may include executing a second machine learning model on the SQL command, the natural language input, and database schema data to generate a refactored SQL command, and the executing comprises executing the refactored SQL command on the database. The technical advantage of this feature is improving the accuracy of the SQL command based on the database schema of the database.

According to an aspect of the example embodiments, there is provided a computer system that includes a processor set, a set of one or more computer-readable storage media, and program instructions, collectively stored in the set of one or more storage media, for causing the processor set to perform operations that include receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application. A technical advantage of the computer system is that the SQL command that is generated is highly accurate resulting in fewer errors and more accurate data retrieval when the SQL command is executed against the database.

In some embodiments, the processor set may perform operations that include determining hidden query content from the natural language input based on execution of the machine learning model and generating a sub-query which includes the hidden query content. The technical effect of this invention is identifying query content that is not specifically spoken by a user. The technical advantage of this feature is that the user does not need specific knowledge of the underlying schema of the database to have an accurate SQL command generated.

In some embodiments, the processor set may perform operations that include searching a plurality of layers of the tree structure and identifying a plurality of query attributes for the SQL command, respectively, and the generating comprises generating the SQL command to include the plurality of query attributes. The technical advantage of this feature is identifying specific query attributes using a narrowly refined tree structure thereby improving the accuracy of the SQL command.

In some embodiments, the processor set may perform operations that include executing a Monte Carlo Tree Search (MCTS) on the tree structure starting from a root node of the tree structure to decide a path in the tree structure which includes a child node that contains a greatest upper confidence bound. The technical advantage of this feature is using a search algorithm to perform a smart search of the tree structure which requires significantly less time than performing a generic search of the entire tree structure.

In some embodiments, the processor set may perform operations that include identifying tables to be queried from the database and at least one join operation to be performed on the tables, from the tree structure. The technical advantage of this feature is that the tree structure can be used to identify query components such as table names, join operations, and the like, thereby alleviating a need for a human to identify these components.

In some embodiments, the processor set may perform operations that include identifying an operation for the SQL command including at least one of an aggregate function, a Boolean function, and a numeric calculation, and column identifiers for the operation, from the tree structure. The technical advantage of this feature is that the tree structure can be used to identify numerical functions with an SQL query thereby alleviating a need for a human to identify these functions.

In some embodiments, the processor set may perform operations that include executing a second machine learning model on the SQL command, the natural language input, and database schema data to generate a refactored SQL command, and the executing comprises executing the refactored SQL command on the database. The technical advantage of this feature is improving the accuracy of the SQL command based on the database schema of the database.

According to an aspect of the example embodiments, there is provided a computer program product that includes a set of one or more computer-readable storage media, and program instructions, collectively stored in the set of one or more computer-readable storage media, for causing a processor set to perform computer operations that include receiving a natural language input via a software application, executing a machine learning model on the natural language input to determine a plurality of sub-queries corresponding to the natural language input, searching a tree structure for field values that correspond to the plurality of sub-queries and relationships between the field values, generating a structured query language (SQL) command based on the field values and relationships between the field values and executing the SQL command on a database to generate query results and return the query results to the software application. A technical advantage of the computer program product is that the SQL command that is generated is highly accurate resulting in fewer errors and more accurate data retrieval when the SQL command is executed against the database.

In some embodiments, the computer operations may include determining hidden query content from the natural language input based on execution of the machine learning model and generating a sub-query which includes the hidden query content. The technical effect of this feature is identifying query content that is not specifically spoken by a user. The technical advantage of this feature is that the user does not need specific knowledge of the underlying schema of the database to have an accurate SQL command generated.

In some embodiments, the computer operations may include searching a plurality of layers of the tree structure and identifying a plurality of query attributes for the SQL command, respectively, and the generating comprises generating the SQL command to include the plurality of query attributes. The technical advantage of this feature is identifying specific query attributes using a narrowly refined tree structure, thereby improving the accuracy of the SQL command.

In some embodiments, the computer operations may include executing a Monte Carlo Tree Search (MCTS) on the tree structure starting from a root node of the tree structure to decide a path in the tree structure which includes a child node that contains a greatest upper confidence bound. The technical advantage of this feature is using a search algorithm to perform a smart search of the tree structure which takes significantly less time than performing a generic search of the entire tree structure.

In some embodiments, the computer operations may include identifying tables to be queried from the database and at least one join operation to be performed on the tables, from the tree structure. The technical advantage of this feature is that the tree structure can be used to identify query components such as table names, join operations, and the like, thereby alleviating a need for a human to identify these components.

In some embodiments, the computer operations may include identifying an operation for the SQL command including at least one of an aggregate function, a Boolean function, and a numeric calculation, and column identifiers for the operation, from the tree structure. The technical advantage of this feature is that the tree structure can be used to identify numerical functions with an SQL query thereby alleviating a need for a human to identify these functions.

In some embodiments, the computer operations may include executing a second machine learning model on the SQL command, the natural language input, and database schema data to generate a refactored SQL command, and the executing comprises executing the refactored SQL command on the database. The technical advantage of this feature is improving the accuracy of the SQL command based on the database schema of the database.

The SQL conversion system described herein may be hosted within a software application, a service, or the like, which may be hosted by a host platform such as a cloud platform, a web server, a database, or the like.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Thus, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

FIG. 1 illustrates a computing environment 100 according to an embodiment of the instant solution. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for executing at least some of the computer code involved in performing the inventive methods, such as complex SQL conversion system 116. In addition to block 116, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 116, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Knowledge graphs can effectively store knowledge and can be used to search quickly through specific query methods. The example embodiments are directed to a system that generates an SQL command using a highly efficient knowledge graph which is referred to herein as a "business forest". The business forest may be constructed in the form of a knowledge graph in which business knowledge is divided into different business domains to build business trees. In these trees, leaf nodes may include atomic SQL commands with the simplest business logic. These commands are the smallest units for generating KPIs. Through effective query methods, it's possible to locate correct atomic SQL commands related to a natural language input. Based on the atomic SQL commands, a machine learning model can generate SQL commands for complex business logic.

The system described herein may generate the SQL command using a plurality of steps. For example, the steps may include receiving a natural language input (e.g., from a user, etc.) and decomposing the natural language input into sub-queries. Given the difficulty in generating correct SQL commands for a complex natural language input, especially in scenarios with intricate business logic, it can be beneficial to decompose a complex natural language input into simpler, more manageable sub-queries based on the natural language input. For example, a machine learning model can be used to convert the natural language input into a plurality of sub-queries.

The system may also build a business forest. The business forest can be built using business logic knowledge, and the trees therein can be built according to different business domains. These tree structures can be divided into different business layers according to the data model, and the leaf nodes may be composed of atomic SQL command corresponding to the simplest business logic. The system may also perform a smart search of the tree structures in the business forest. For example, the system may execute a Monte Carlo tree search algorithm which is optimized and incorporated with business features to improve search accuracy. This helps to quickly locate the atomic SQL command that best suits the user's problem. The system may integrate all of the atomic SQL commands corresponding to the sub-queries and, in conjunction with the natural language input, refactor the results to regenerate the final SQL command.

Some of the benefits of the example embodiments include enhancing the accuracy of the Text-to-SQL generation process, especially for more complex user input (queries, questions, etc.). A set of processes is built to solve complex business backgrounds, which can improve the accuracy of SQL generation. In addition, a business forest is proposed, which can be built based on business knowledge and data model. Furthermore, the system can use the business forest to find the atomic SQL command. Additionally, a Monte Carlo search algorithm which is optimized using business knowledge, can be executed on the business forest to identify the atomic SQL components within leaf nodes of the tree structures within the business forest.

Figure 2A:
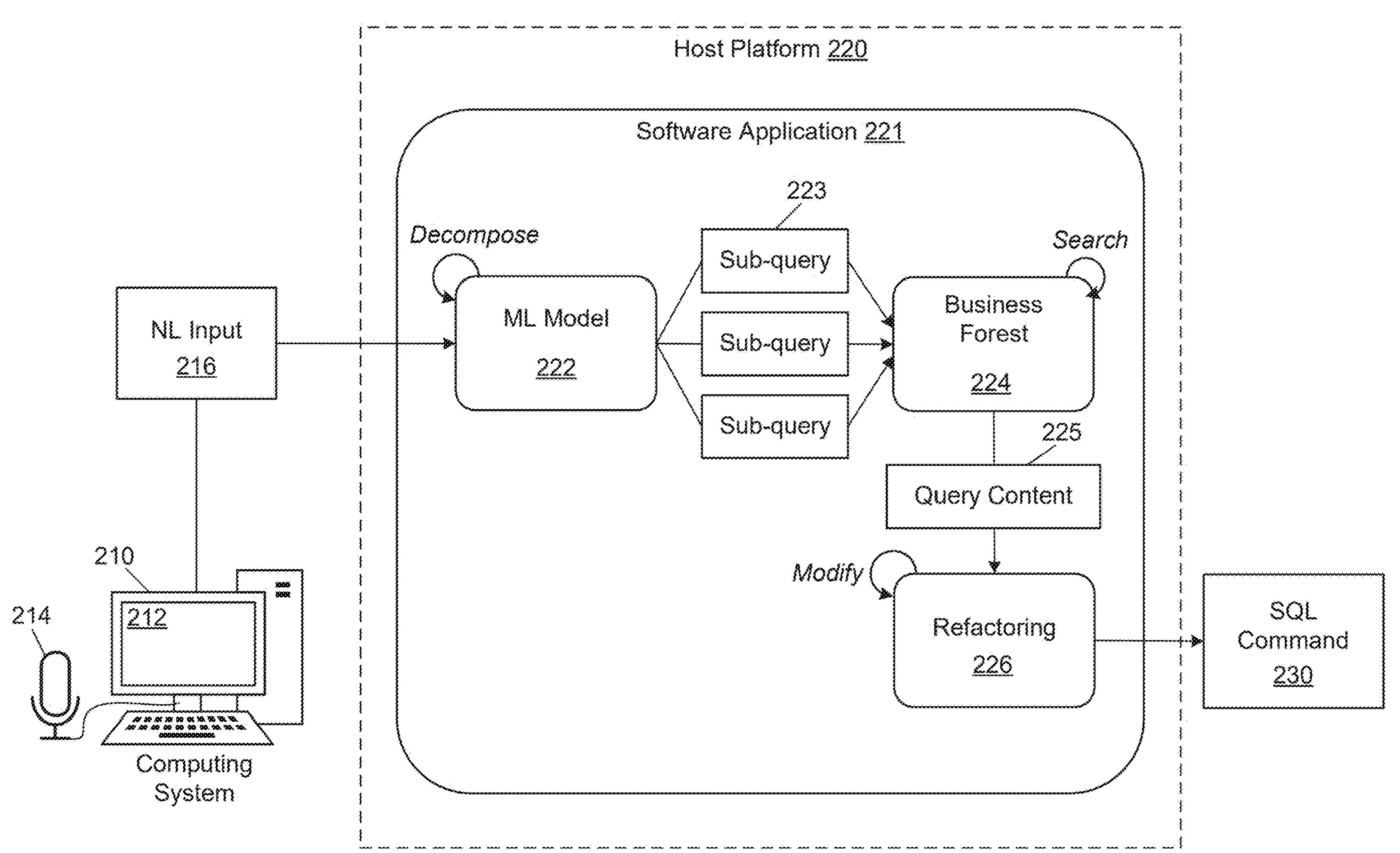
FIG. 2A is a diagram illustrating a process of generating an SQL command from a natural language input according to examples and features of the instant solution.

FIG. 2A illustrates a process 200A of generating an SQL command from a natural language input according to examples and features of the instant solution. Referring to FIG. 2A, a software application 221 hosted by a host platform 220 may perform a text-to-SQL conversion process to convert a natural language input 216 into an SQL command 230. The host platform 220 may be a cloud platform, a web server, a distributed system, or the like. The software application 221 may be hosted by the host platform 220 and made available online or over a network. As an example, the software application 221 may be a progressive web application (PWA) that is accessible by a computing system 210 over the Internet. As another example, the software application 221 may be an on-premises application that is accessible over a private network, a locally installed software application, and the like.

In this example, the computing system 210 may be used by a user to provide a natural language input 216. For example, a user may type the natural language input 216 into a graphical user interface (GUI) of the software application 221 which is being displayed on a display device 212 of the computing system 210. As another example, the user may speak the natural language input 216 which can be captured by an audio recording device 214 that is attached to the computing system 210. For example, the audio recording device 214 may be a microphone or the like.

According to various embodiments, the software application 221 may identify a plurality of sub-queries 223 from the natural language input 216 using a machine learning model 222. In this example, the natural language input 216 may be a question that is posed by a user. For example, the question may be complex, unclear, contain spurious information, and the like. The machine learning model may be trained to identify sub-queries based on natural language inputs using training data that includes sub-queries mapped to natural language inputs.

In some embodiments, the machine learning model 222 may request feedback about the query decomposition and the sub-queries 223 from the user of the computing system 210 by displaying information on a GUI of the display device 212. In response, the user may provide feedback indicating whether the sub-queries are correct or not. The feedback, along with the sub-queries 223 and the natural language input 216 can be used to retrain the ML model 222 to further improve the accuracy of the ML model 222 by learning from its own successes and mistakes.

The sub-queries 223 may be used to search a business forest 224 to find atomic query parts that are related to the sub-queries 223. The atomic query parts may be identified using a searching algorithm which searches the tree structured within the business forest 224 for the most relevant content. The atomic query parts may be combined into query content 225 which is then forwarded to a refactoring module 226. The refactoring module 226 may also ingest schema data of a database that is going to be queried, a prompt, and the like, to obtain additional information to help improve the accuracy of the final command. Here, the refactoring module 226 may enhance the query content 225 by adding missing pieces, and the like, to generate the SQL command 230. Further examples of the steps performed by the software application 221 are shown and described in FIGS. 3A-3D.

Figure 2B:
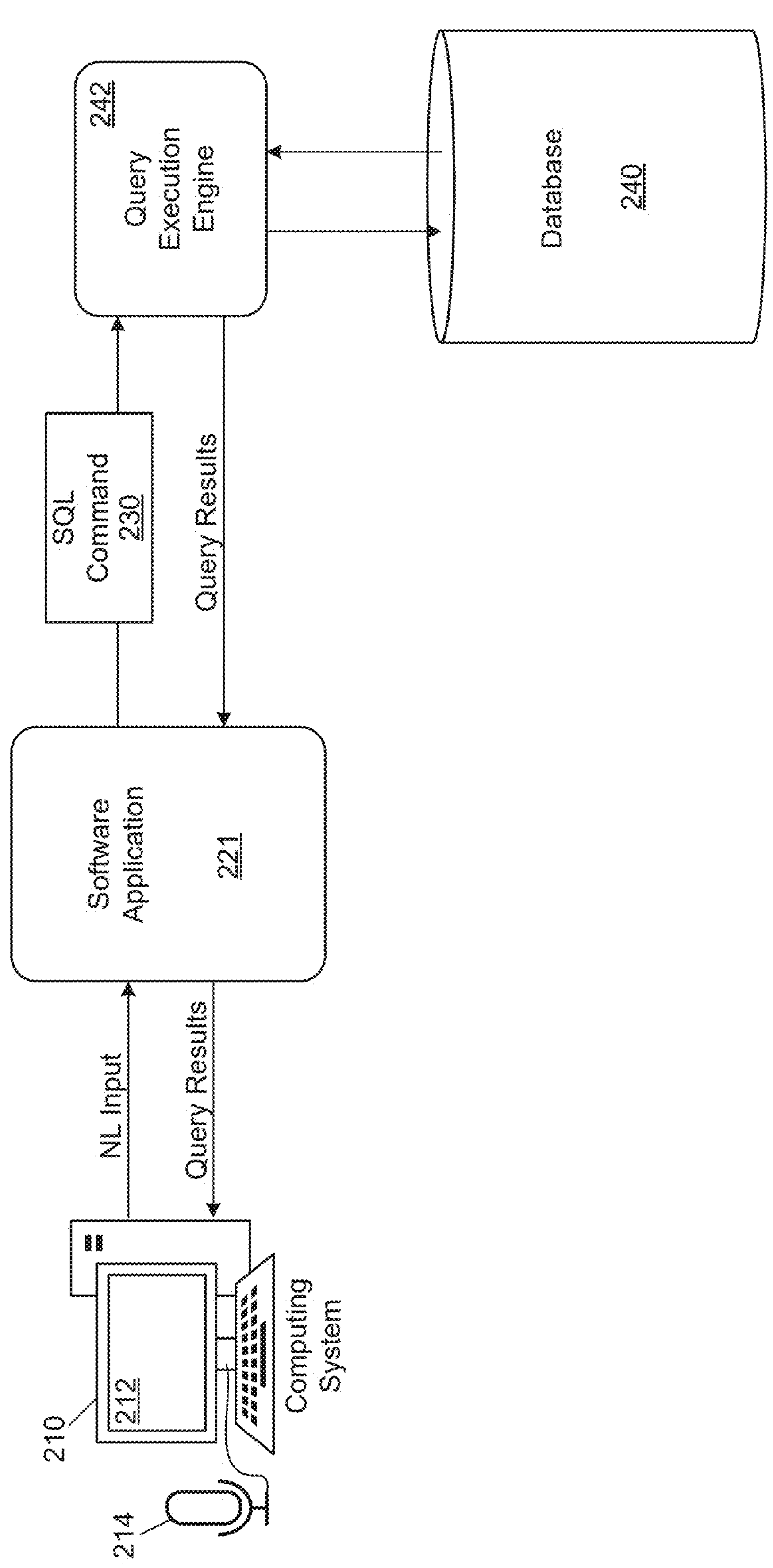
FIG. 2B is a diagram illustrating a process of querying a database with the SQL command generated in FIG. 2A, according to examples and features of the instant solution.

FIG. 2B illustrates a process 200B of querying a database 240 with the SQL command 230 generated in FIG. 2A, according to examples and features of the instant solution.

Referring to FIG. 2B, the software application 221 may be communicably coupled to the database 240. Here, the software application 221 may submit the SQL command 230 to a query execution engine 242 of the database 240. In response, the query execution engine 242 may execute the instructions within the SQL command 230 to access data stored within the database 240. Here, the query execution engine 242 may read data, write data, delete data, modify data, and the like, within the database 240.

In response to querying the database 240, the query execution engine 242 may generate query results (e.g., table data, messages, result data, etc.) and provide the query results to the software application 221. In response, the software application 221 may display the results on a GUI of the software application 221 which is visible on the display device 212 of the computing system 210. Here, the user may enter feedback indicating whether the query results are correct or not. The feedback, along with the SQL command 230, the sub-queries 223 and the natural language input 216 can be used to retrain the ML model 222 to further improve the accuracy of the ML model 222 by learning from its own successes and mistakes.

Figure 3A:
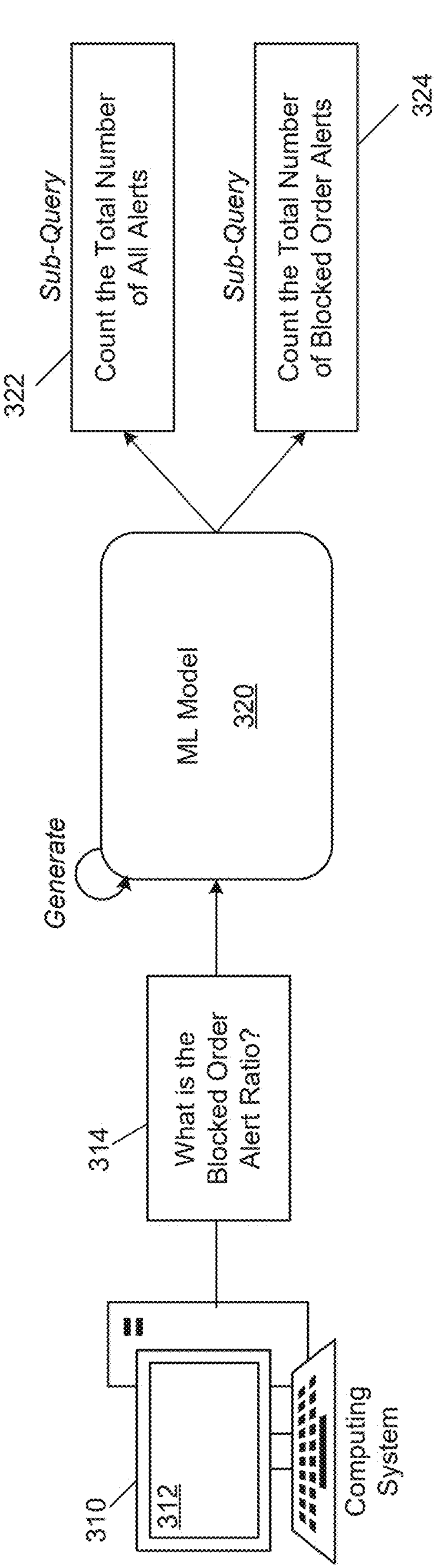
FIG. 3A is a diagram illustrating a process of decomposing a natural language input into multiple sub-queries according to examples and features of the instant solution.

FIG. 3A illustrates a process 300A of decomposing a natural language input into multiple sub-queries according to examples and features of the instant solution. Referring to FIG. 3A, a machine learning model 320 may be utilized to convert a natural language input 314 into a plurality of sub-queries including sub-query 322 and sub-query 324. In this example, the machine learning model 320 may correspond to the machine learning model 222 that is shown in the example of FIG. 2A. A user may provide a natural language input 314 through a computing system 310. For example, the user may type a command into a GUI that is displayed on a display device 312 of the computing system 310. In response to receiving the natural language input 314, the machine learning model 320 may convert the natural language input 314 into a first sub-query 322 and a second sub-query 324.

Here, the natural language input 314 includes the statement "What is the Blocked Order Alert Ratio?" Here, the system may track multiple types of alerts including a blocked order alert as well as other alert types such as order arrived late, price tag was missing, order was updated, etc. In order to obtain the blocked order alert ratio, the system needs to obtain the total number of blocked orders for all alert types and the total number of blocked order alerts. In this example, the machine learning model 320 may understand and break down the user's query, converting it into a form that the system can use to retrieve the correct data from the business forest. In the example of FIG. 3A, the two sub-queries include "count the total number of blocked alerts" and "count the total number of all alerts".

For example, the machine learning model 320 may receive multiple inputs including the natural language input 314, to generate the two sub-queries 322 and 324. For example, the input may include business knowledge. This includes additional context or information about the business domain (such as definitions of "blocked sales orders" and "blocked delivery orders"). This may be used by the machine learning model 320 to understand the specific business logic and terminology that might not be fully explained in the query. The data model used by the database being queried may also be input into the machine learning model 320. For example, the database model may include names of tables, relationships between tables, any rules or constraints, etc. As another example, the input may include contextual clues such as the user's previous queries or the current query's domain, which helps the machine learning model 320 understand the scope of the search (e.g., "alerts," "sales orders," "inventory," etc.). The machine learning model 320 may decompose the natural language input 314 into atomic SQL commands that can be mapped using a business forest.

Figure 3B:
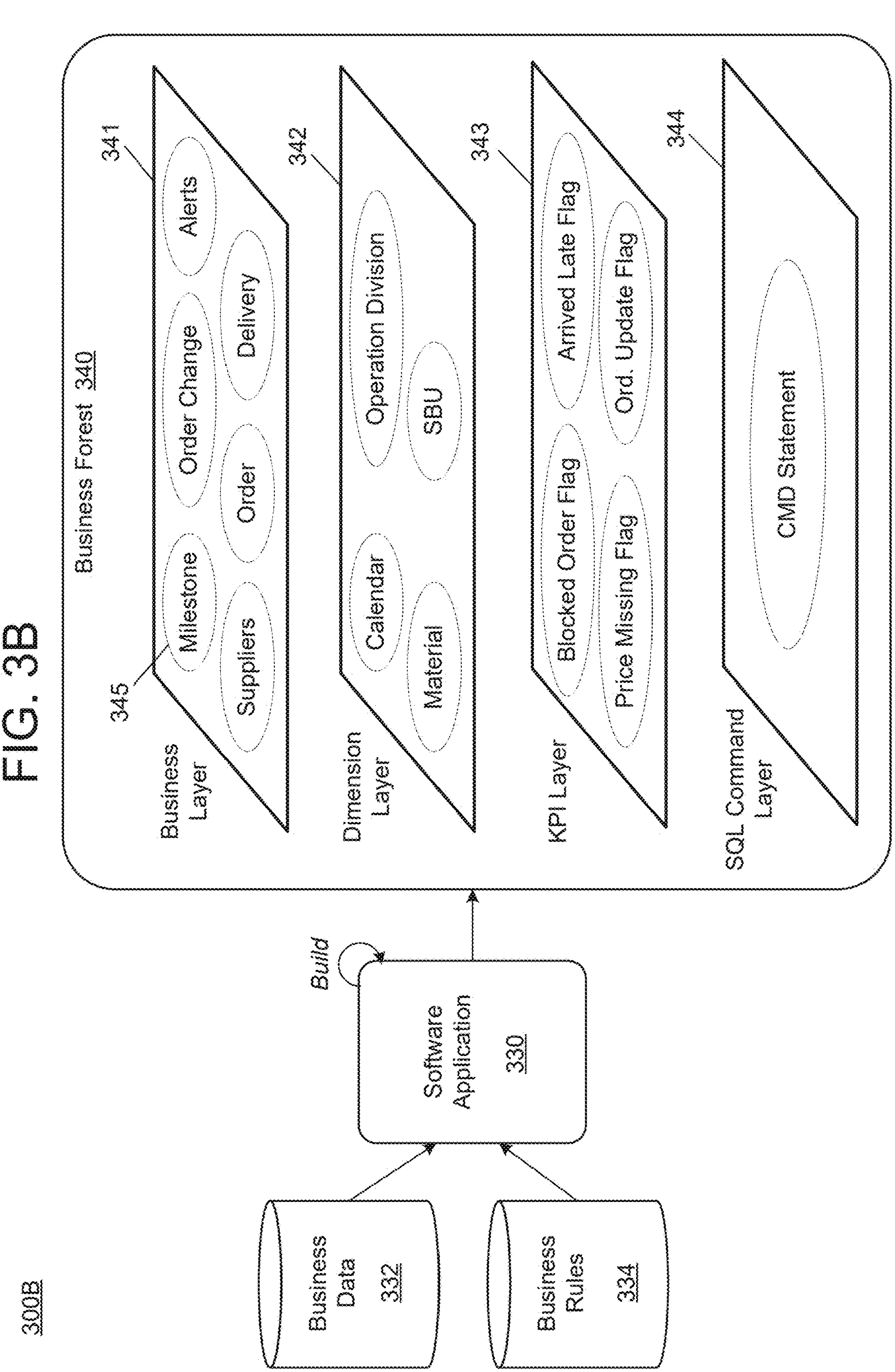
FIG. 3B is a diagram illustrating a process of generating a business forest for use in generating an SQL command according to examples and features of the instant solution.

FIG. 3B illustrates a process 300B of generating a business forest 340 for use in generating an SQL command according to examples and features of the instant solution. Referring to FIG. 3B, a software application 330, such as the software application 221 shown in the example of FIG. 2A, may be used to build a business forest 340 which includes a graph structure of nodes 345 interconnected with edges. In this example, the business forest 340 includes a plurality of tree structures (e.g., layers) that make up the business forest 340. The plurality of layers may have connections between them as well identifying relationships between the different layers of the tree. For example, the software application 330 may ingest business data from a database 332 and/or business rules from a database 334 and build the business forest 340.

The business forest 340 is a data tree that stores information at different levels, with each leaf node containing executable SQL statements. To quickly and accurately generate the corresponding SQL command, the data tree includes four layers: a business layer 341, a dimension layer 342, a key performance indicator (KPI) layer 343, and a SQL command layer 344. The software application 330 may use clustering algorithms to map the business rules to different business domains. It then resolves the rules within business domain to obtain the inner information of nodes in designed layers.

The business layer 341 includes the description of business rules for different domains, along with key business fields, KPI fields, and dimension information fields, etc. The dimension layer 342 includes dimension data involved in the business domains. Each node contains related fields from the corresponding dimension table and indicates the node's depth within the data tree. The KPI layer 343 includes all the KPI fields involved in the business domains, consisting of fields with Boolean or numeric types. These fields are then calculated to quantify or evaluate the value in business domain. The SQL command layer 344 includes SQL statements for certain KPI fields in the corresponding dimension, serving as the smallest execution unit in the data tree. Each layer may contribute to the final SQL command that is generated.

In some embodiments, the software application 330 may classify business rules into corresponding business areas located in the Business Layer 341, such as the 'Alert' domain, which contains rules related to Alert KPI calculation. By resolving the mapped business rules, the software application 330 can use the business forest 340 to retrieve the key business fields, dimension information, and KPI indicators that need to be calculated in the domain. The dimension layer 342 can be built by combining the dimension table in the pre-established data model and the resolved dimension information from rules.

The KPI layer 343 can be constructed by combining the key business fields and KPI indicators. According to the linked parent nodes in the previous layers, the leaf node of the SQL command layer 344 can be used to construct the SQL command. Since there are multiple independent business domains, data trees of different business domains can be maintained together to form a data forest. The software application 330 can be used to analyze the intention of user and locate corresponding data trees for solving the problem.

The data trees may also be built based on business rules which include the predefined guidelines and logic that govern how data should be queried and processed within a specific business domain. These rules can include data retrieval rules which include instructions on how to retrieve or aggregate data (e.g., "Count distinct SALES_DOCUMENT where BLOCKED_SO_FLAG=1"). The rules may include relationships between data including descriptions of how different data points are related (e.g., "Sales orders are linked to delivery orders through the SALES_DOCUMENT field"). The rules may include calculation logic which includes the business logic for how KPIs or metrics should be calculated (e.g., "The ratio of blocked orders is calculated by dividing blocked SOs by total sales orders"). The rules may include filtering conditions which include rules for filtering data based on specific conditions (e.g., "Only include records where OPEN_ORDER_FLAG=1"). The rules may also include data transformation rules which identify rules for transforming raw data into meaningful business insights (e.g., converting raw sales numbers into revenue). These rules ensure that the data queries are aligned with business objectives and correct calculations.

The business forest 340 may also be built based on business areas which are specific domains within the business that relate to particular functions or aspects of the organization's operations. These can differ based on the system or data being queried. Examples include supply chain management which covers areas like inventory management, order processing, delivery logistics, and alerts (e.g., "Blocked SO Alerts"). Other examples include sales data which covers sales performance, revenue, discounts, and customer relations, and financing, which covers areas such as financial reporting, budgeting, profit/loss statements, etc. Each business area focuses on a particular aspect of the business and is associated with distinct sets of data, metrics, and KPIs. Business areas will vary depending on the type of system (e.g., ERP, CRM) and the specific business context.

In some embodiments, the pre-established data model may be used to construct the business forest 340. The pre-established data model includes a structured schema that organizes the data in a way that reflects the business's logical and physical needs and can include tables and relationships that define the entities (e.g., orders, customers, products) and the relationships between them (e.g., a sales order is related to a customer through a customer ID). The pre-established data model may include dimension tables that include detailed descriptions of different dimensions (e.g., geography, product categories) that allow for data slicing, fact tables that include measurable, quantitative data (e.g., sales transactions, order amounts), and keys and indexes which specify primary and foreign keys to link different tables and improve query performance. The data model is predefined before the business forest 340 is constructed, providing the structure that the software uses to map business rules, dimensions, and KPIs.

In this example, dimensions refer to descriptive attributes or categories in the data that provide context for analysis. They are typically columns in dimension tables, but can also refer to relationships between data entities. Common examples of dimensions include product dimensions (e.g., product categories, names, brands, etc.), time dimensions (e.g., date, month, quarter, year), and geography dimensions (e.g., region, country, city, etc.).

In the dimension layer 342, dimensions are identified and categorized from the pre-established data model, for example, from the dimension tables. The construction of the dimension layer involves identifying the relevant dimension tables in the data model (e.g., "Product" table, "Customer" table), extracting the relevant dimension fields (e.g., product category, customer region) necessary for the query, organizing these dimensions into a logical structure to facilitate the query construction, linking the right dimensions to the KPIs or facts that need to be calculated, and the like.

In some embodiments, the business forest 340 may be constructed based on key fields of data. The key fields are the essential attributes used to link tables, filter data, perform calculations, and the like. The key fields can be identified by business requirements, which are often defined by the business context, such as order ID, customer ID, product ID, etc., that are critical for business analysis. The key fields can include data model structure which defines which fields are primary keys (e.g., "ORDER_ID") or foreign keys (e.g., "CUSTOMER_ID") that help join tables. The key fields can include data analysis needs which are chosen based on the need to aggregate or filter data in meaningful ways (e.g., sales by region, order status by product). Key fields are generally those that are involved in joins, aggregations, or used in calculations.

In addition, the business forest 340 may be constructed based on KPIs, which are identified from business goals and analysis requirements. The goals and requirements can be defined by business objectives, which include KPIs that are aligned with the organization's strategic goals (e.g., sales growth, customer retention, operational efficiency). The goals and requirements can be defined by domain-specific metrics, which include KPIs that are specific to the business area or domain. For example, in supply chain management, a KPI might be "Number of Blocked Sales Orders" or "Average Order Processing Time." The goals and requirements can be defined by data availability, which includes KPIs that are identified based on the data available in the data model. The model must include fields that can be aggregated or calculated (e.g., counts, sums, averages) to derive these KPIs. The KPIs are defined by domain experts and translated into measurable metrics that align with the business objectives.

Figure 3C:
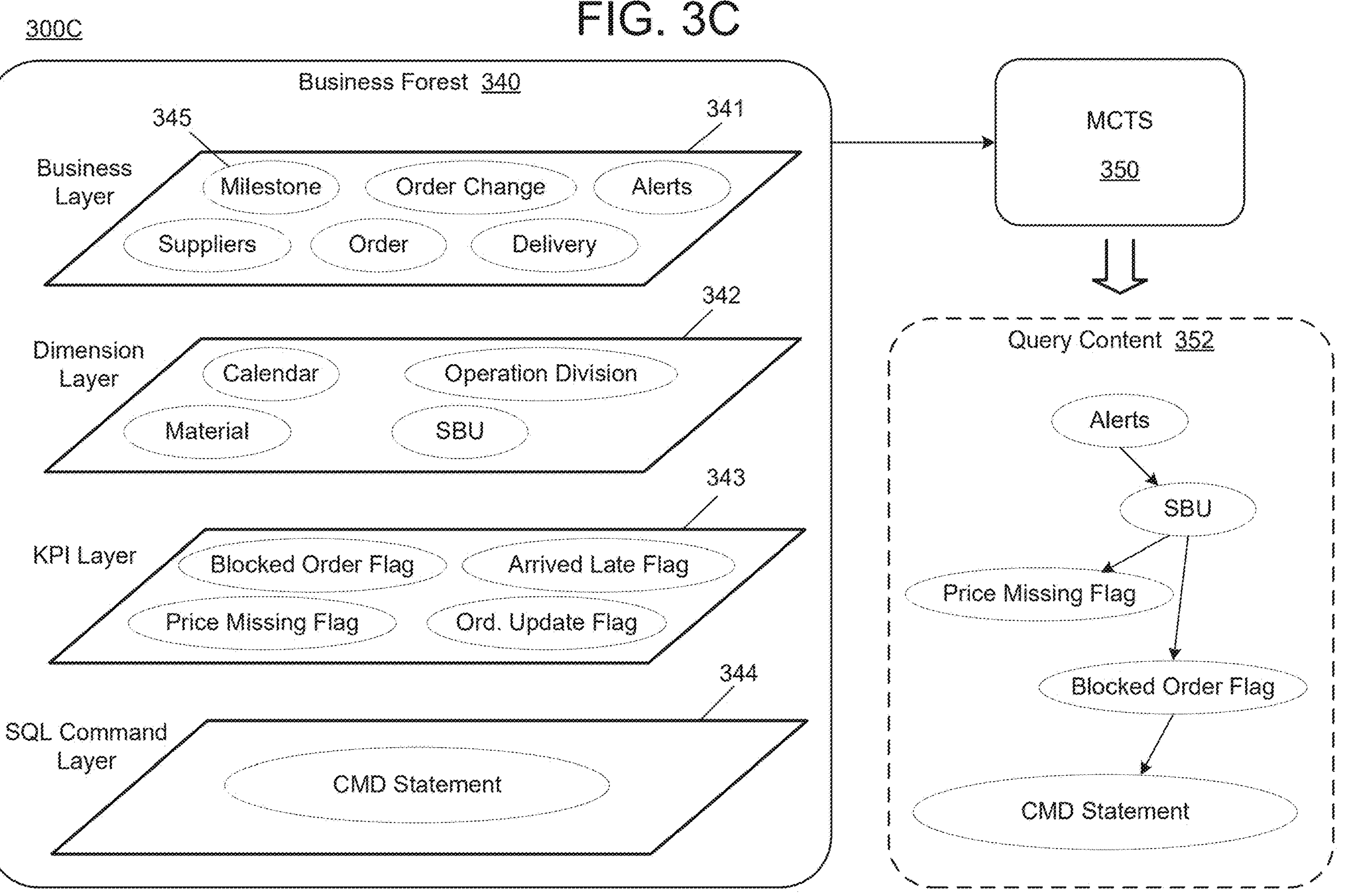
FIG. 3C is a diagram illustrating a process of searching the business forest for query content according to examples and features of the instant solution.

FIG. 3C illustrates a process 300C of searching the business forest 340 for query content according to examples and features of the instant solution. Referring to FIG. 3C, a tree search may be performed on the business forest 340 generated in FIG. 3B using the sub-queries 322 and 324 generated in FIG. 3A. The tree search may be performed by the software application 330 executing a Monte Carlo tree search (MCTS) algorithm 350 on the business forest 340 using the sub-queries 322 and 324 as input. The MCTS algorithm 350 may perform a "smart search" to quickly locate the target nodes in each layer of the business forest 340. The MCTS algorithm 350 may identify query content 352 by mapping nodes together within the business forest 340 including the lowest layer (SQL command layer 344). For example, the MCTS algorithm 350 may identify a subset of the tree structure in each of the layers that are related to a sub-query. Here, the MCTS algorithm 350 may connect nodes in each of the layers together to determine the SQL command.

For example, the software application 330 may break down the complex problem by breaking the natural language input into sub-queries. For example, the software application 330 may use an a large language model (LLM), to decompose descriptions involving multiple domains, ultimately creating detailed queries based on different domains. The MCTS algorithm 350 may be used to perform node searches. Traditional MCTS algorithms rely solely on the tree structure during the search process and cannot understand the business knowledge contained in the business tree. However, in the example embodiments, it can be difficult to accurately locate the target atomic SQL. By utilizing business knowledge to improve the Upper Confidence Bound (UCB) of the MCTS algorithm, the example embodiments can help MCTS algorithm quickly locate the target leaf node, improving the accuracy of the search.

Node selection during tree descent is achieved by choosing the node that maximizes some quantity, analogous to the multiarmed bandit problem in which a player must choose the slot machine (bandit) that maximizes the estimated reward each turn. An Upper Confidence Bound (UCB) formula may include the following formula:

$$v_i + C \times \sqrt{(\ln N/n_i)}$$

Here, vi is the estimated value of a node, ni is the number of times the node has been visited, and N is the total number of times that its parent node is visited. Meanwhile, C is a tunable bias parameter.

The node selection process works by starting at a root node R, recursively selecting optimal child nodes until a leaf node L is reached. The process initially starts with the root node and the initial state is $S_0$. Thus, the current state=$S_0$. The process checks if the current state is a leaf node. If it is not, the process then explores the child node, from that node, which has a maximum UCB value among the child nodes. If the current state is a leaf node L, the process checks the number of times the node has been visited (ni). If it's the first traversal, a roll out is performed. To perform a roll out, the process takes the state Si, that was passed to the Rollout process. If it is a terminal state, return the value at that state. If it is not a terminal state, select random available actions to go to the terminal state, from the current state. Take the value of the terminal state and use it as an estimate and update the values at the state Si and all the ancestor nodes, including the root node.

If L is a not a terminal node (i.e., it does not end the game) then create one or more child nodes and select one C. Run a simulated playout from C until a result is achieved. Next, the process updates the current move sequence with the simulation result. Each node must contain two pieces of information: an estimated value based on simulation results and the number of times it has been visited. In its simplest and most memory efficient implementation, MCTS will add one child node per iteration. It may be beneficial to add more than one child node per iteration depending on the application.

In this example, the MCTS algorithm 350 may perform multiple simulations on the business forest 340 to determine which path is most likely to find the node most relevant to the respective sub-query. The process may include a selection process which begins by starting from the root node and selecting the next most promising node based on an improved node selection strategy (UCB). Next, if the selected node is expandable (i.e., has unexplored child nodes), the search can add one or more child nodes. In addition, the search may perform a random simulation from the newly added node until reaching a leaf node. In addition, the search may perform backtracking to update the simulation results (e.g., to simplify it as relevance to the query) back through the nodes previously passed. In order to generate the final SQL command, each layer (e.g., business layer 341, dimension layer 342, KPI layer 343, and SQL command layer 344) of the business forest 340 contributes to the final query, although their contributions are at different levels of abstraction and detail.

For example, the business layer 341 may provide high-level business logic, rules, and context. This layer defines the scope and objectives of the query. The business layer 341 may contribute to the final SQL command by defining business domains and identifying which part of the business logic needs to be queried (e.g., "alerts," "sales orders," or "inventory"). The business layer 341 may identify key business fields (e.g., "alert type," "sales document," "blocked flag") that need to be included in the query. The business layer 341 may identify KPIs or metrics to be calculated including which KPIs (e.g., "count of blocked sales orders," "ratio of blocked orders") need to be derived in the SQL. Further, the business layer 341 may identify filtering conditions such as initial filtering conditions (e.g., which data needs to be counted or selected based on certain conditions like "BLOCKED_SO_FLAG=1").

The dimension layer 342 provides the context for the dimensional data, including relationships between tables, data structures, and any relevant fields that contribute to the final query. The dimension layer 342 may contribute to the final SQL command by identifying table joins including the necessary tables and how they should be joined (e.g., joining the "ORDER_INFO" table with the "SALES_DOCUMENT" table based on specific keys). The dimension layer 342 may contribute to the dimension fields which include fields from dimension tables (e.g., "PRODUCT_CATEGORY," "SALES_REGION") that should be included for filtering or grouping. The dimension layer 342 may identify data filtering criteria including any additional filtering criteria for specific dimensions (e.g., "WHERE REGION='US'"). If applicable, the dimension layer 342 may contribute grouping conditions for aggregating data based on specific dimensions (e.g., grouping by "SALES_DOCUMENT" or "DO_NUMBER").

The KPI layer 343 may be used to define the specific KPIs that need to be computed from the raw data, including aggregates, sums, averages, or counts. The KPI layer 343 may contribute to the final SQL command by identifying aggregate functions for the command including aggregation functions (e.g., COUNT, SUM, AVG) based on the KPIs (e.g., "COUNT (DISTINCT SALES_DOCUMENT)" or "SUM (ORDER_VALUE)"). The KPI layer 343 may identify Boolean and Numeric Calculations including calculated fields or Boolean conditions (e.g., "CASE WHEN BLOCKED_SO_FLAG=1 THEN 1 ELSE 0 END" to compute the alert status). The KPI layer 343 may identify columns that calculate derived metrics (e.g., calculating the ratio of blocked SO alerts to total orders).

The SQL command layer 344 may contain the atomic SQL commands, which are the smallest executable units in the data model. These represent specific actions to retrieve or calculate data. These commands are atomic in nature, meaning they handle a very specific business logic (e.g., counting distinct sales orders or calculating a ratio). Each command typically corresponds to a single task that feeds into the larger SQL generation process.

The SQL command layer 344 may contribute raw SQL queries to the SQL command. These are the foundational SQL queries that retrieve data for specific KPIs. For example, SELECT count (distinct SALES_DOCUMENT) FROM ORDER_INFO WHERE BLOCKED_SO_FLAG=1 AND OPEN_ORDER_FLAG=1 for counting blocked sales orders, SELECT count (distinct DO_NUMBER) FROM ORDER_INFO WHERE BLOCKED_DO_FLAG=1 AND OPEN_ORDER_FLAG=1 for counting blocked delivery orders, and the like. The SQL command layer 344 may identify data retrieval logic which encapsulates the logic of data selection, joining, and basic filtering. The SQL command layer 344 ensures that the data needed to compute KPIs is retrieved correctly.

The smart search process in the business forest 340 is essentially a very advanced "search engine" that helps find the right pieces of information to answer a user's query, based on a vast and complex set of data (the business forest 340). The process works by understanding the natural language input. The system may identify what the user is asking. Imagine a user asking for something like, "What's the total number of blocked sales orders?" The system breaks down this question into smaller, simpler parts such as identifying the concept of "blocked sales orders" and understanding that it needs to count them. Next, the system looks for relevant information. Once the system understands the question, it needs to find where to get the information needed to answer it. The business forest 340 is a structure with different layers, like a tree, and each part of the tree contains different types of data. The smart search process uses this structure to search for the most relevant pieces of data that can help answer the question.

The smart search process can use business knowledge to make sure the right pieces of information are found, and the system applies business rules and domain-specific knowledge. These rules help the system figure out what data is needed for each type of query (e.g., blocked sales orders might need to be counted from a specific table, with certain conditions like BLOCKED_SO_FLAG=1). The system uses an algorithm (Monte Carlo Tree Search, or MCT) to search through the Business Forest in an intelligent way. Instead of just searching randomly, it uses business knowledge to focus on the areas of the tree that are most likely to give the correct result. Think of it as a smart search that knows which areas are more relevant to the question, allowing it to find the correct data quickly. Once the system has found the right pieces of data, it can combine them to form a full answer to the query. This could mean adding together several smaller queries (such as counting blocked sales orders and blocked delivery orders) to get a complete result. Accordingly, the query content 352 may include content that can be used to query a database for the necessary data to respond to the natural language input. However, the query content 352 may not be fully accurate.

Figure 3D:
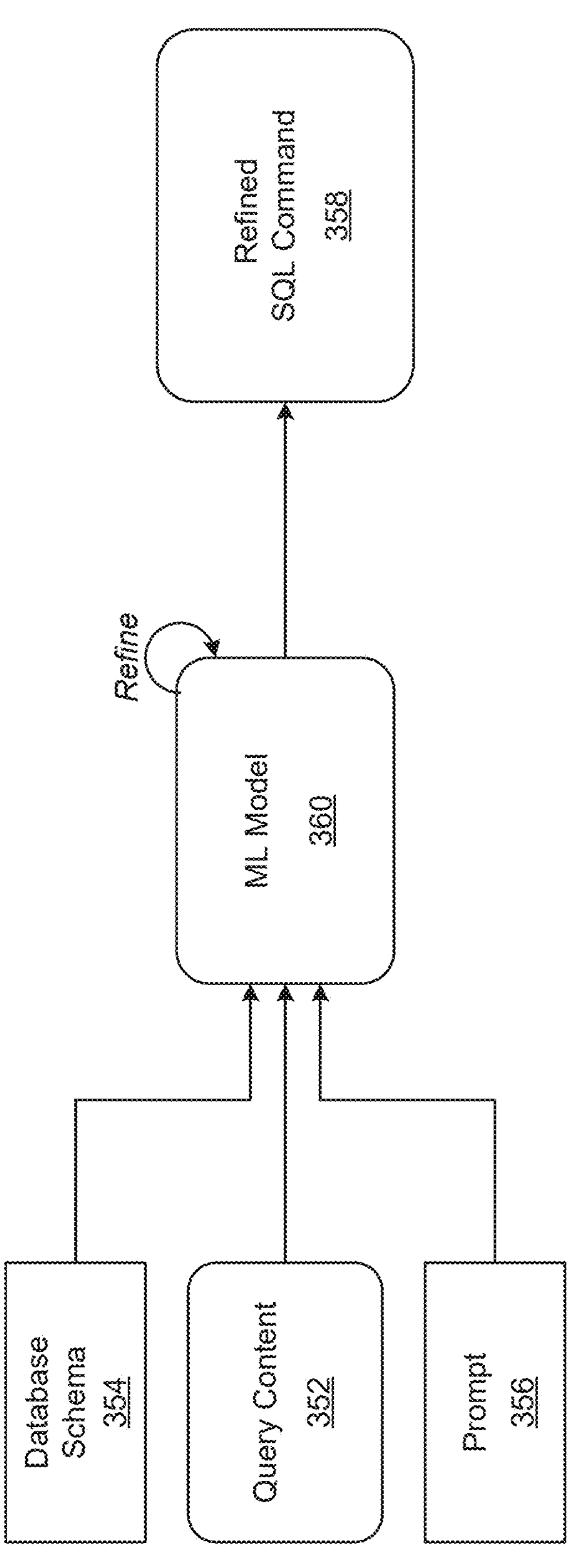
FIG. 3D is a diagram illustrating a process of refactoring the query content to generate an SQL command according to examples and features of the instant solution.

FIG. 3D illustrates a process 300D of refactoring the query content 352 to generate a refined SQL command 358 according to examples and features of the instant solution. Referring to FIG. 3D, the software application 330 may also include a machine learning model 360 that is capable of refining the query content output from the search process described in the example of FIG. 3C. Here, the machine learning model 360 may ingest additional content, for example, a database schema 354 of the database to be queried, a prompt which includes specific instructions for the machine learning model 360 to use to refine the query content 352, and the like. The output of the machine learning model 360 is a refined SQL command 358. The refined SQL command 358 may include the atomic query components identified within the query content 352, as well as additional content such as table names, key field names, and the like.

Although not shown in FIG. 3D, the input to the machine learning model 360 may also include the natural language input and/or the sub-queries generated by the machine learning model 320 along with the corresponding atomic SQL commands obtained in the previous step, and the table schema information. The output of the machine learning model 360 is a complete final SQL command corresponding to the natural language input. The prompt 356 may include dynamic contents that will change along with the use cases. As an example, the prompt 356 may include "Act as an industry SQL expert. Your task is to review the query content and generate the final SQL for the raw question based on the table schema and the query content." The prompt 356 may also specify the inputs and what the output should be. The result of the refactoring process shown in FIG. 3D is a more accurate SQL command.

Figure 4A:
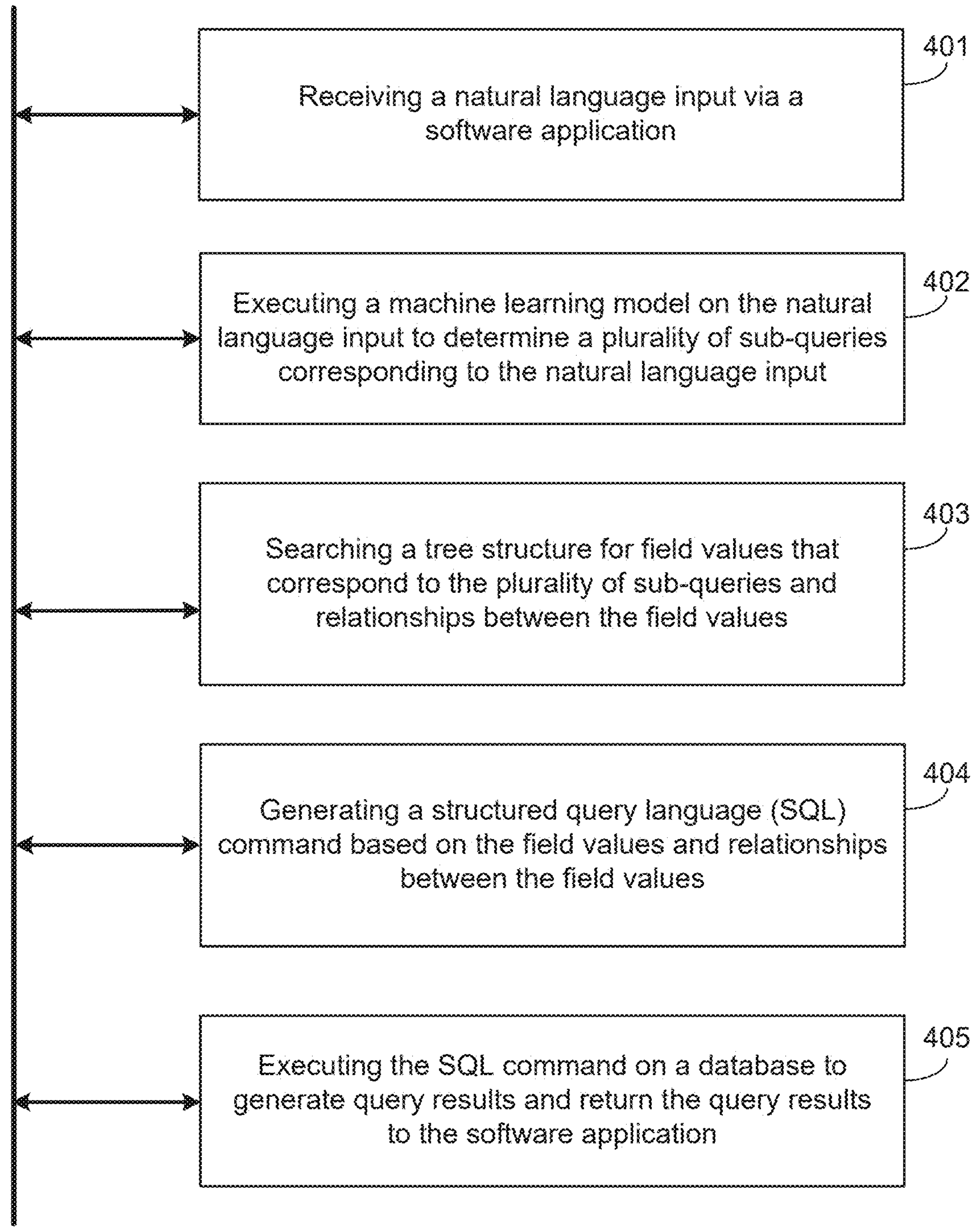
FIG. 4A is a flow diagram illustrating a method according to examples and features of the instant solution.

FIG. 4A illustrates a flow diagram of a method 400, according to example embodiments. Referring to FIG. 4A, in 401, the method may include receiving a natural language input via a software application. In 402, the method may include executing a machine learning model on the natural language input to determine a plurality of sub-queries corresponding to the natural language input. In 403, the method may include searching a tree structure for field values that correspond to the plurality of sub-queries and relationships between the field values. In 404, the method may include generating a structured query language (SQL) command based on the field values and relationships between the field values. In 405, the method may include executing the SQL command on a database to generate query results and return the query results to the software application.

Figure 4B:
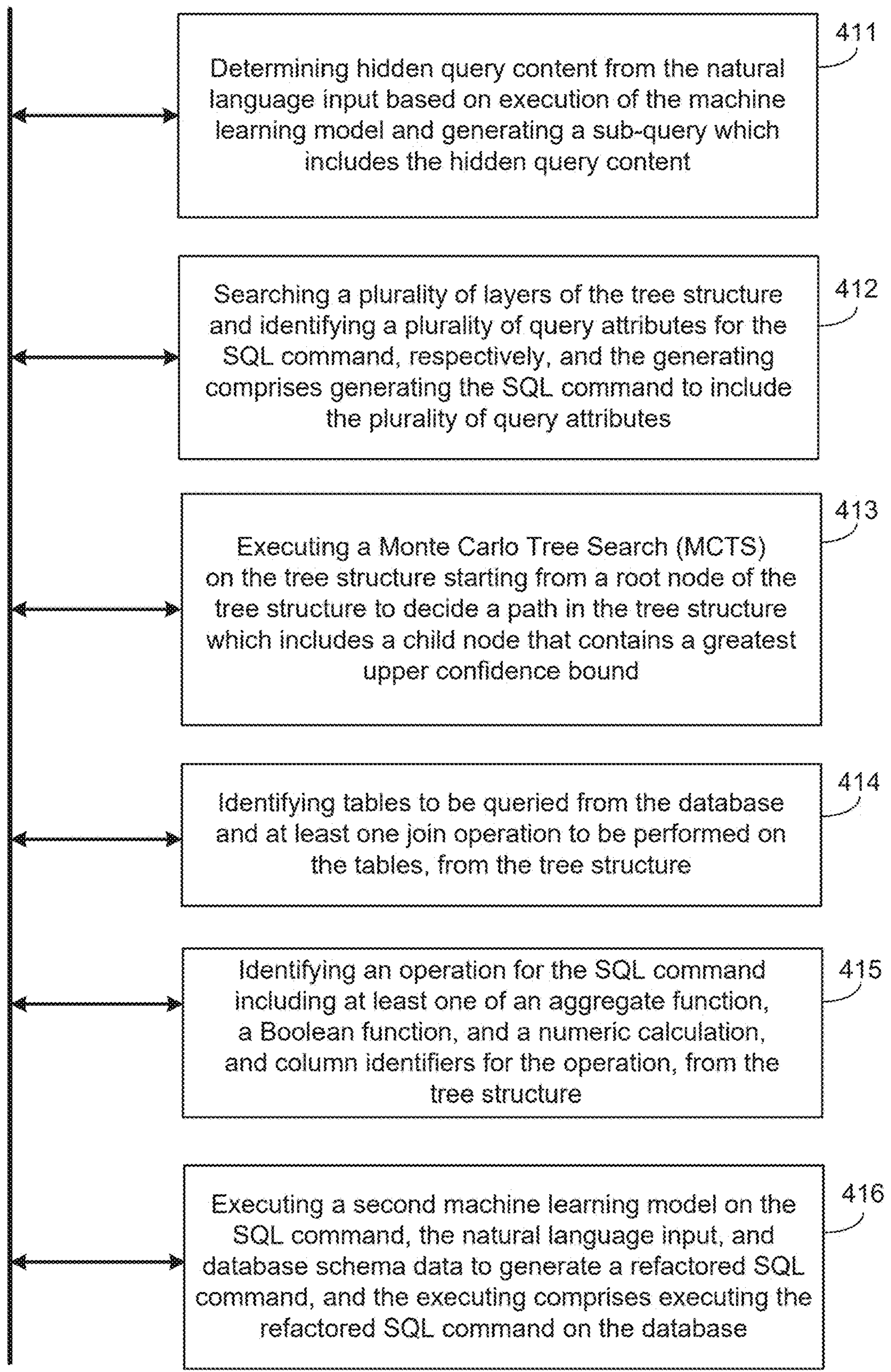
FIG. 4B is a flow diagram illustrating a method according to additional examples and features of the instant solution.

FIG. 4B illustrates a flow diagram of a method 410, according to example embodiments. Referring to FIG. 4B, in 411, the method may include determining hidden query content from the natural language input based on execution of the machine learning model and generating a sub-query which includes the hidden query content. In 412, the method may include searching a plurality of layers of the tree structure and identifying a plurality of query attributes for the SQL command, respectively, and generating the SQL command to include the plurality of query attributes. In 413, the method may include executing a Monte Carlo Tree Search (MCTS) on the tree structure starting from a root node of the tree structure to decide a path in the tree structure which includes a child node that contains a greatest upper confidence bound.

In 414, the method may include identifying tables to be queried from the database and at least one join operation to be performed on the tables, from the tree structure. In 415, the method may include identifying an operation for the SQL command including at least one of an aggregate function, a Boolean function, and a numeric calculation, and column identifiers for the operation, from the tree structure. In 416, the method may include executing a second machine learning model on the SQL command, the natural language input, and database schema data to generate a refactored SQL command, and the executing comprises executing the refactored SQL command on the database.

Detailed descriptions of training a machine learning model and executing a machine learning model are further described and depicted herein.

Figure 5A:
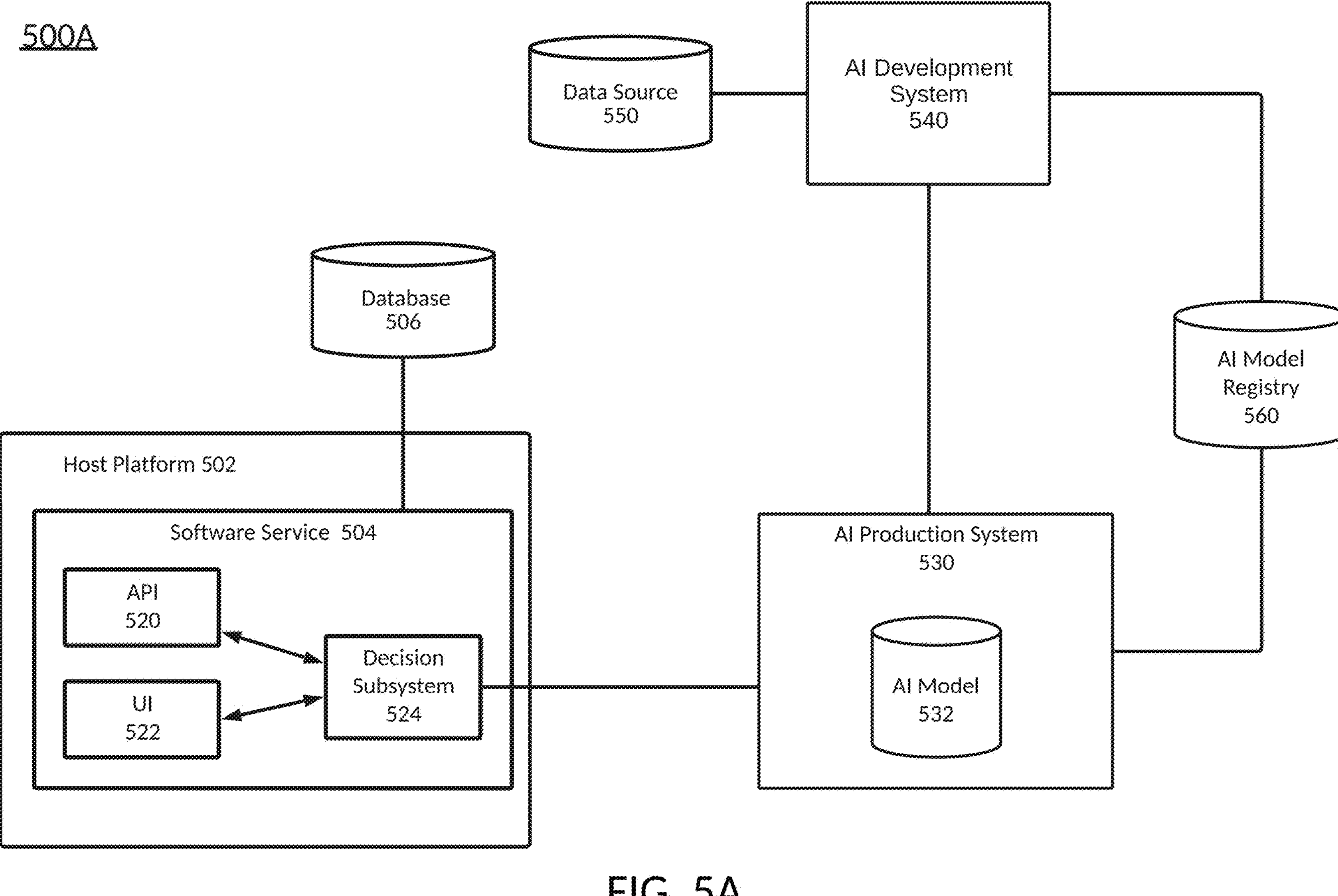
FIG. 5A is a system diagram illustrating integration of an AI model into any decision point according to the examples and features of the instant solution.

FIG. 5A illustrates an artificial intelligence (AI) network diagram 500A that supports AI-assisted decision points in a software service executing on a computer. As one example, the AI model being trained in the examples herein may refer to an AI model for any of the tasks performed herein including a machine learning model, a neural network, an LLM, and the like. While the example instant solution shown utilizes a neural network, which is a type of machine learning (ML) model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a type of machine learning model that relies on training data to learn associations and connections, improving its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI models refer to present-day AI models and future AI models.

Artificial intelligence systems have been built and trained to perform various tasks in an automated manner. For example, artificial intelligence systems receive and understand verbal and/or written dialogue and function as digital assistants, speech-to-text programs, etc. Other artificial intelligence systems are trained on different types of information to allow the trained system to generate content-such as new works of art based on the styles seen, or new compound ideas based on the history of chemical research.

Foundation models are types of artificial intelligence systems that are trained on a broad set of unlabeled data that can be used for different tasks, with minimal fine-tuning. The unlabeled data includes in some instances imagery and/or language. In response to a short prompt being input into the foundation model, the system generates an output such as an entire essay, or a complex image, based on the parameters that are set forth in the input prompt. The foundation model is able to produce an output that attempts to meet the parameters even if the foundation model was never trained with specific training data that included the exact parameters, e.g., was never trained for that exact argument or to generate an image in that way.

Using self-supervised learning and transfer learning, foundation models can apply information that they have learnt about one situation to another. For example, like a human learns how to drive one car, for example, and without too much effort, could learn how to drive other types of vehicles such as other cars, a truck, or a bus. The foundation model similarly is used to achieve proficiency in some new area without having to be trained completely from scratch. Foundation models seem to have inherent creativity in performing tasks such as stringing together coherent arguments or creating entirely original pieces of art. Foundation models are established in the technology of natural-language processing. One example of how foundation models are helpful is that for previous generation of AI techniques, if you wanted to build an AI model that could summarize bodies of text for you, you would need tens of thousands of labeled examples just for the summarization use case. With a pre-trained foundation model, the labeled data requirements are dramatically reduced. First, the foundation model is fine-tuned with a domain-specific unlabeled corpus to create a domain-specific foundation model. Then, using a much smaller amount of labeled data, potentially just a thousand labeled examples, a foundation model is trained for summarization. The domain-specific foundation model can be used for many tasks as opposed to the previous technologies that required building models from scratch in each use case. Foundation models are even applicable in areas such as computer programming coding analysis, generation, and repair.

Some foundation models are used for sentiment analysis. With pre-trained foundation models, sentiment analysis on a new language can be trained using as little as a few thousand sentences-100 times fewer annotations required than previous models. Reducing labeling requirements will make it much easier for implementation in various technical areas. Systems that execute specific tasks in a single domain are giving way to broad AI that learns more generally and works across domains and problems. Foundation models, trained on large, unlabeled datasets and fine-tuned for an array of applications, are driving this shift.

Large language models (LLMs) are a category of foundation models trained on immense amounts of data making them capable of understanding and generating natural language and other types of content to perform a wide range of tasks. LLMs have been implemented at different levels to enhance their natural language understanding (NLU) and natural language processing (NLP) capabilities. This advancement of LLMs has occurred alongside advances in machine learning, machine learning models, algorithms, neural networks and the transformer models that provide the architecture for these AI systems.

LLMs are a class of foundation models, which are trained on enormous amounts of data to provide the foundational capabilities needed to drive multiple use cases and applications, as well as resolve a multitude of tasks. This LLM concept is in stark contrast to the idea of building and training domain specific models for each of these use cases individually, which is prohibitive under many criteria (most importantly cost and infrastructure), stifles synergies and can even lead to inferior performance.

LLMs represent a significant breakthrough in NLP and artificial intelligence. LLMs are accessible through interfaces like Open AI's Chat GPT-3 and GPT-4, which have garnered the support of Microsoft. Other examples include Meta's Llama models and Google's bidirectional encoder representations from transformers (BERT/ROBERTa) and PaLM models. IBM has also recently launched its Granite model series on watsonx.ai, which has become the generative AI backbone for other IBM products like watsonx Assistant and watsonx Orchestrate.

In a nutshell, LLMs are designed to understand and generate text like a human, in addition to other forms of content, based on the vast amount of data used to train them. They have the ability to infer from context, generate coherent and contextually relevant responses, translate to languages other than English, summarize text, answer questions (general conversation and FAQs) and even assist in creative writing or code generation tasks. LLMs are able to do some or all of these tasks thanks to many, e.g., billions of, parameters that enable them to capture intricate patterns in language and perform a wide array of language-related tasks. LLMs are revolutionizing applications in various fields, from chatbots and virtual assistants to content generation, research assistance and language translation.

LLMs operate by leveraging deep learning techniques and vast amounts of textual data. These models are typically based on a transformer architecture, like the generative pre-trained transformer, which excels at handling sequential data like text input. LLMs consist of multiple layers of neural networks, each with parameters that can be fine-tuned during training, which are enhanced further by a numerous layer known as the attention mechanism, which dials in on specific parts of data sets.

During the training process, these models learn to predict the next word in a sentence based on the context provided by the preceding words. The model does this through attributing a probability score to the recurrence of words that have been tokenized-broken down into smaller sequences of characters. These tokens are then transformed into embeddings, which are numeric representations of this context.

To ensure accuracy, this process involves training the LLM on a large corpus of text (e.g., in the billions of pages), allowing the LLM to learn grammar, semantics and conceptual relationships through zero-shot and self-supervised learning. Once trained on this training data, LLMs can generate text by autonomously predicting the next word based on the input they receive and drawing on the patterns and knowledge they have acquired. The result is coherent and contextually relevant language generation that can be harnessed for a wide range of NLU and content generation tasks.

Model performance can also be increased through prompt engineering, prompt-tuning, fine-tuning and other tactics like reinforcement learning with human feedback (RLHF) to remove the biases, hateful speech and factually incorrect answers known as "hallucinations" that are often unwanted byproducts of training on so much unstructured data. LLMs augment conversational AI in chatbots and virtual assistants to enhance the interactions that provide context-aware responses that mimic interactions with human agents.

LLMs also excel in content generation, automating content creation for blog articles, explanatory materials, and other writing tasks. LLMs aid in summarizing and extracting information from vast datasets, accelerating knowledge discovery. LLMs also play a vital role in language translation, breaking down language barriers by providing accurate and contextually relevant translations. LLMs can even be used to write code, or "translate" between programming languages. LLMs contribute to accessibility by assisting individuals with disabilities, including text-to-speech applications and generating content in accessible formats.

LLMs often include abilities such as:

Text generation: language generation abilities, such as writing emails, blog posts or other mid-to-long form content in response to prompts that can be refined and polished. An excellent example is retrieval-augmented generation (RAG).

Content summarization: summarize long articles, news stories, research reports, corporate documentation and even interaction history into thorough texts tailored in length to the output format.

AI assistants: chatbots that answer queries, perform backend tasks and provide detailed information in natural language as a part of an integrated, self-serve solution for handling inquiries.

Code generation: assists developers in building applications, finding errors in code and uncovering security issues in multiple programming languages, even "translating" between them.

Sentiment analysis: analyze text to determine a user's tone in order to understand user feedback at scale and aid in brand reputation management.

Language translation: provides wider coverage to organizations across languages and geographies with fluent translations and multilingual capabilities.

Software service 504 (see FIG. 5A), executing on host platform 502 (see FIG. 5A) may provide one or more application programming interfaces (APIs) 520 that enable interaction with other software components via a set of data definitions and protocols. In some examples and features of the instant solution, the APIs provided may employ Simple Object Access Protocol (SOAP), Remote Procedure Calls (RPC), and Representational State Transfer (REST) techniques. In some examples and features of the instant solution, the plurality of APIs 520 send data to one or more decision subsystems 524 of the software service 504 to assist in decision-making. In some examples and features of the instant solution, the software service 504 stores data included in API requests or data generated during processing the API requests into one or more databases 506 (see FIG. 5A).

Software service 504 may provide one or more user interfaces (UIs) 522, such as a server-side hosted graphical user interface (GUI). In some examples and features of the instant solution, the UIs 522 provided employ template-based frameworks, component-based frameworks, etc. In some examples and features of the instant solution, these UIs 522 send data to one or more decision subsystems 524 of the software service 504 to assist with decision-making. In some examples and features of the instant solution, the software service 504 stores data included in UI requests or data generated during processing the UI requests into one or more databases 506.

Software service 504 may include one or more decision subsystems 524 that drive a decision-making process of the software service 504. In some examples and features of the instant solution, the decision subsystems 524 receive data from one or more APIs 520 as input into the decision-making process. In some examples and features of the instant solution, a decision subsystem 524 may receive data from one or more UIs 522 as input to the decision-making process. A decision subsystem 524 may gather service configuration or historical execution data from one or more databases 506 to aid in the decision-making process. A decision subsystem 524 may provide feedback to an API 520 or a UI 522.

An AI production system 530 may be used by a decision subsystem 524 in a software service 504 to assist in its decision-making process. The AI production system 530 includes one or more AI models 532 that are executed to generate a response, such as, but not limited to, a prediction, a categorization, a UI prompt, etc. In some examples and features of the instant solution, an AI production system 530 is hosted on a server. In some examples and features of the instant solution, the AI production system 530 is cloud hosted. In some examples and features of the instant solution, the AI production system 530 is deployed in a distributed multi-node architecture.

An AI development system 540 creates one or more AI models 532. In some examples and features of the instant solution, the AI development system 540 utilizes data from one or more data sources 550 to develop and train one or more AI models 532. The data sources 550 may be local or third-party data sources. Further, the data provided by the data sources may be real-world or synthetic. In some examples and features of the instant solution, the AI development system 540 utilizes feedback data from one or more AI production systems 530 for new model development and/or existing model re-training. In some examples and features of the instant solution, the AI development system 540 resides and executes on a server. In some examples and features of the instant solution, the AI development system 540 is cloud hosted. In some examples and features of the instant solution, the AI development system 540 is deployed in a distributed multi-node architecture. In some examples and features of the instant solution, the AI development system 540 utilizes a distributed data pipeline/analytics engine.

Once an AI model 532 has been trained and validated in the AI development system 540, it may be stored in an AI model registry 560 for retrieval by either the AI development system 540 or by one or more AI production systems 530. The AI model registry 560 resides in a dedicated server in one example of the instant solution. In some examples and features of the instant solution, the AI model registry 560 is cloud hosted. In some examples and features of the instant solution, the AI model registry 560 resides in the AI production system 530. In some examples and features of the instant solution, the AI model registry 560 is a distributed database.

Figure 5B:
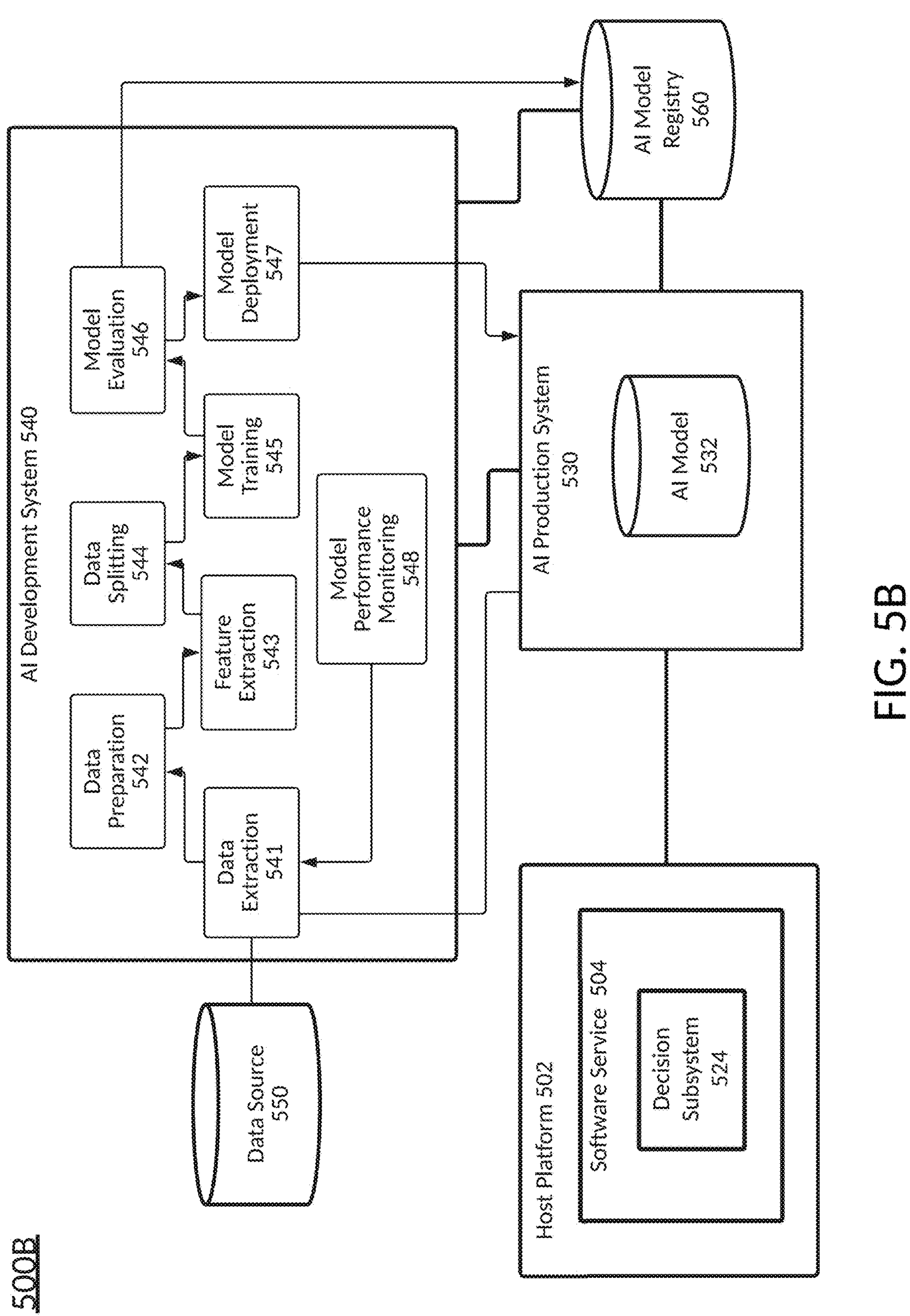
FIG. 5B is a diagram illustrating a process for developing an AI model that supports AI-assisted computer decision points according to the examples and features of the instant solution.

FIG. 5B illustrates a process 500B for developing one or more AI models that support AI-assisted decision points. An AI development system 540 executes steps to develop an AI model 532 that begins with data extraction 541, in which data is loaded and ingested from one or more data sources 550. In some examples and features of the instant solution, historical model feedback data is extracted from one or more AI production systems 530.

Once the data has been extracted during data extraction 541, it undergoes data preparation 542 for model training. In some examples and features of the instant solution, this step involves statistical testing of the data to see how well it reflects real-world events, its distribution, the variety of data in the dataset, etc., and the results of this statistical testing may lead to one or more data transformations being employed to normalize one or more values in the dataset. In some examples and features of the instant solution, data deemed to be noisy is cleaned. A noisy dataset includes values that do not contribute to the training, such as, but not limited to, null and long string values. Data preparation 542 may be a manual process or an automated process using one or more of the elements and/or functions described and/or depicted herein.

Features of the data are identified and extracted during the feature extraction step 543. In some examples and features of the instant solution, a feature of the data is internal to the prepared data from the data preparation step 542. In some examples and features of the instant solution, a feature of the data requires a piece of prepared data from the data preparation step 542 to be enriched by data from another data source to be useful in developing the AI model 532. In some examples and features of the instant solution, identifying relevant features (relevant attributes) for model training are performed via an automated process using one or more of the elements and/or functions described and/or depicted herein. Once the features have been identified, the values of the features are collected into a dataset that will be used to develop the AI model 532.

The dataset output from the feature extraction step 543 is split 544 into a training and validation data set. The training data set is used to train the AI model 532, and the validation data set is used to evaluate the performance of the AI model 532 on unseen data.

The AI model 532 is trained and tuned 545 using the training data set from the data splitting step 544. In this step, the training data set is provided to an AI algorithm and an initial set of algorithm parameters which may be automatically determined based on the interdependence between the relevant attributes determined according to various embodiments. The performance of the AI model 532 is then tested within the AI development system 540 utilizing the validation data set from step 544. These steps may be repeated with adjustments to one or more algorithm parameters until the model's performance is acceptable based on various goals and/or results.

The AI model 532 is evaluated 546 in a staging environment (not shown) that resembles the target AI production system 530. This evaluation uses a validation dataset to ensure the performance in an AI production system 530 matches or exceeds expectations. In some examples and features of the instant solution, the validation dataset from step 544 is used. In some examples and features of the instant solution, one or more unseen validation datasets are used. In some examples and features of the instant solution, the staging environment is part of the AI development system 540, and the staging environment is managed separately from the AI development system 540. Once the AI model 532 has been validated, it is stored in an AI model registry 560, where it can be retrieved for deployment and future updates. In some examples and features of the instant solution, the model evaluation step 546 may be a manual process or an automated process using one or more of the elements and/or functions described and/or depicted herein.

In some examples and features of the instant solution, the AI development system includes a user interface (not shown). The user interface may be used to manage the development system infrastructure, the steps 541-548 within the development system, the interim data transmitted between the various steps 541-548, and the data sources 550.

Once an AI model 532 has been validated and published to an AI model registry 560, it may be deployed during the model deployment step 547 to one or more AI production systems 530. In some examples and features of the instant solution, the performance of deployed AI model 532 is monitored 548 by the AI development system 540. In some examples and features of the instant solution, AI model 532 feedback data is provided by the AI production system 530 to enable model performance monitoring 548, and the AI development system 540 periodically requests feedback data for model performance monitoring 548, which includes one or more triggers that result in the AI model 532 being updated by repeating steps 541-548 with updated data from one or more data sources 550.

Figure 5C:
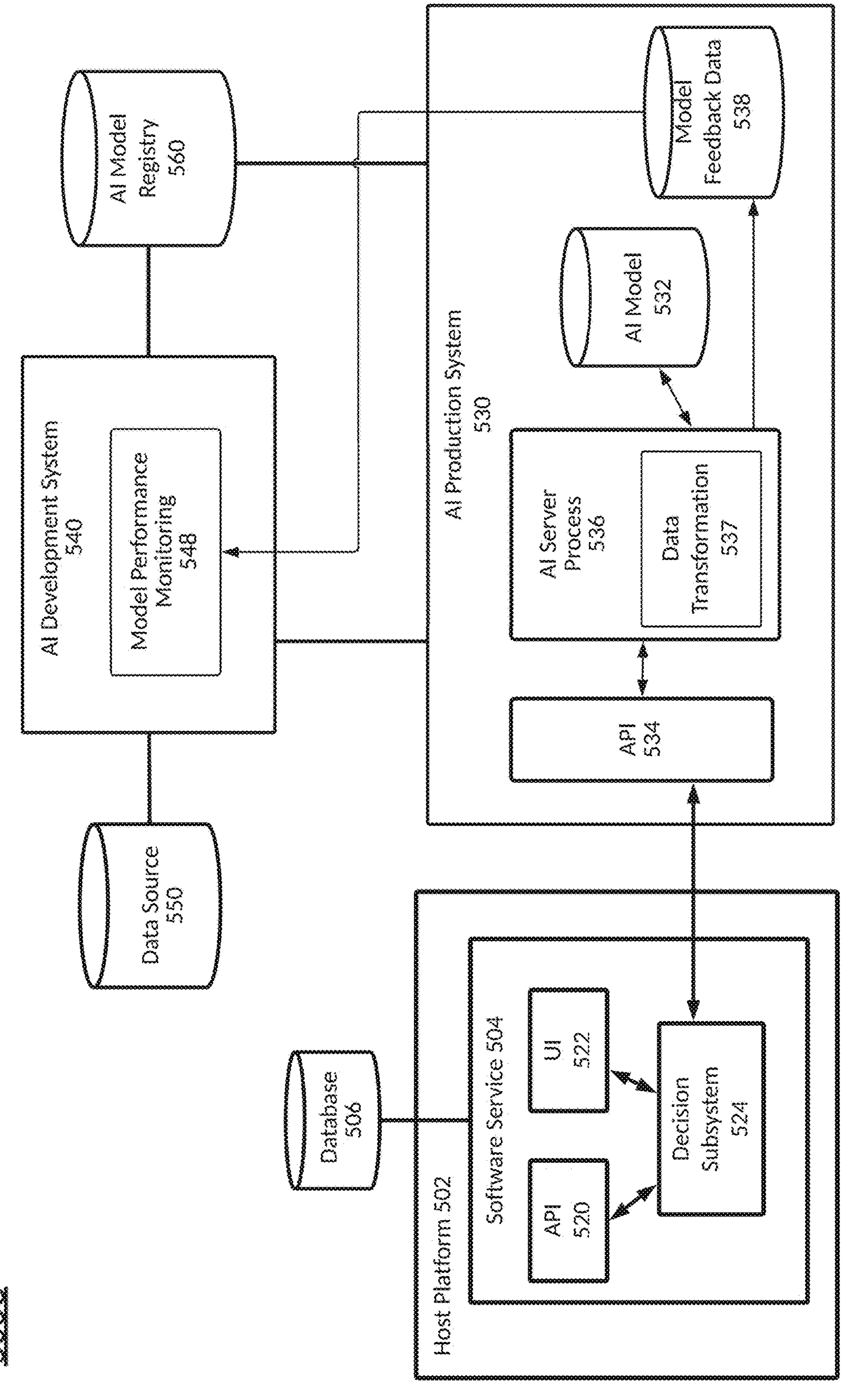
FIG. 5C is a diagram illustrating a process for utilizing an AI model that supports AI-assisted computer decision points according to examples and features of the instant solution.

FIG. 5C illustrates a process 500C for utilizing an AI model that supports AI-assisted decision points. As stated previously, the AI model utilization process depicted herein reflects ML, which is a particular branch of AI, but this instant solution is not limited to ML and is not limited to any AI algorithm or combination of algorithms.

Referring to FIG. 5C, an AI production system 530 may be used by a decision subsystem 524 in software service 504 to assist in its decision-making process. The AI production system 530 provides an API 534, executed by an AI server process 536 through which requests can be made. In some examples and features of the instant solution, a request may include an AI model 532 identifier to be executed based on the type of request. In some examples and features of the instant solution, a data payload (e.g., to be input to the AI model during execution) is included in the request. The data payload may include API 520 data from software service 504, UI 522 data from software service 504 or data from other software service 504 subsystems (not shown).

Upon receiving the API 534 request, the AI server process 536 may transform 537 the data payload or portions of the data payload to be valid feature values in an AI model 532. Data transformation 537 may include, but is not limited to, combining data values, normalizing data values, and enriching the incoming data with data from other data sources 550. Once the data transformation occurs, the AI server process 536 executes the appropriate AI model 532 using the transformed input data. Upon receiving the execution result, the AI server process 536 responds to the API requester, which is a decision subsystem 524 of software service 504. In some examples and features of the instant solution, the response may result in an update to a UI 522 in software service 504. In some examples and features of the instant solution, the response includes a request identifier that can be used later by the software service 504 to provide feedback on the performance of the AI model 532. In some examples and features of the instant solution, a model feedback record may be added into a model feedback data 538 by the AI server process 536.

In some examples and features of the instant solution, the API 534 includes an interface to provide AI model 532 feedback after an AI model 532 execution response has been processed. This mechanism enables the requester to provide feedback on the accuracy of the AI model 532 results. In some examples and features of the instant solution, the feedback interface includes the identifier of the initial request so that it can be used to associate the feedback with the request. Upon receiving a call into the feedback interface of the API 534, the AI server process 536 creates and adds a model feedback record into the model feedback data 538 which holds historical model feedback records. In some examples and features of the instant solution, the records in this model feedback data 538 are provided to model performance monitoring 548 in the AI development system 540. This model feedback data is streamed to the AI development system 540 or may be provided upon request. In some examples and features of the instant solution, the model feedback records in the model feedback data 538 are used as an input for retraining the AI model 532.

In some examples and features of the instant solution, the AI production system 530 includes a user interface (not shown). The user interface may be used to manage the production system infrastructure, the components of the production system 530-538, and the operation of the AI production system and its components.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

What is claimed is:

1. A computer-implemented method comprising:

receiving a natural language input via a software application;

executing a machine learning model on the natural language input to determine a plurality of sub-queries corresponding to the natural language input;

searching a tree structure for field values that correspond to the plurality of sub-queries and relationships between the field values, wherein the searching comprises searching a plurality of layers of the tree structure and identifying a plurality of query attributes for a structured query language (SQL) command, respectively, and executing a Monte Carlo Tree Search (MCTS) on the tree structure starting from a root node of the tree structure to decide a path in the tree structure which includes a child node that contains a greatest upper confidence bound;

generating the SQL command based on the field values and relationships between the field values, wherein the generating comprises generating the SQL command to include the plurality of query attributes; and executing the SQL command on a database to generate query results and return the query results to the software application.

2. The computer-implemented method of claim 1, wherein the executing the machine learning model comprises determining hidden query content from the natural language input based on execution of the machine learning model and generating a sub-query which includes the hidden query content.

3. The computer-implemented method of claim 1, wherein the searching comprises identifying tables to be queried from the database and at least one join operation to be performed on the tables, from the tree structure.

4. The computer-implemented method of claim 1, wherein the searching comprises identifying an operation for the SQL command including at least one of an aggregate function, a Boolean function, and a numeric calculation, and column identifiers for the operation, from the tree structure.

5. The computer-implemented method of claim 1, wherein the generating comprises executing a second machine learning model on the SQL command, the natural language input, and database schema data to generate a refactored SQL command, wherein the executing comprises executing the refactored SQL command on the database.

6. The computer-implemented method of claim 1, further comprising:

retraining the machine learning model.

7. The computer-implemented method of claim 6, wherein the machine learning model is retrained using at least the natural language input, the plurality of sub-queries and the SQL command.

8. A computer system comprising:

a processor set;

a set of one or more computer-readable storage media; and program instructions, collectively stored in the set of one or more storage media, that cause the processor set to perform computer operations comprising:

receiving a natural language input via a software application;

executing a machine learning model on the natural language input to determine a plurality of sub-queries corresponding to the natural language input;

searching a tree structure for field values that correspond to the plurality of sub-queries and relationships between the field values, wherein the searching comprises searching a plurality of layers of the tree structure and identifying a plurality of query attributes for a structured query language (SQL) command, respectively, and executing a Monte Carlo Tree Search (MCTS) on the tree structure starting from a root node of the tree structure to decide a path in the tree structure which includes a child node that contains a greatest upper confidence bound;

generating the SQL command based on the field values and relationships between the field values, wherein the generating comprises generating the SQL command to include the plurality of query attributes; and executing the SQL command on a database to generate query results and return the query results to the software application.

9. The computer system of claim 8, wherein the executing the machine learning model comprises determining hidden query content from the natural language input based on execution of the machine learning model and generating a sub-query which includes the hidden query content.

10. The computer system of claim 8, wherein the searching comprises identifying tables to be queried from the database and at least one join operation to be performed on the tables, from the tree structure.

11. The computer system of claim 8, wherein the searching comprises identifying an operation for the SQL command including at least one of an aggregate function, a Boolean function, and a numeric calculation, and column identifiers for the operation, from the tree structure.

12. The computer system of claim 8, wherein the generating comprises executing a second machine learning model on the SQL command, the natural language input, and database schema data to generate a refactored SQL command, wherein the executing comprises executing the refactored SQL command on the database.

13. The computer system of claim 8, wherein the program instructions further cause the processor set to perform computer operations comprising:

retraining the machine learning model.

14. The computer system of claim 13, wherein the machine learning model is retrained using at least the natural language input, the plurality of sub-queries and the SQL command.

15. A computer program product comprising:

a set of one or more computer-readable storage media; and program instructions, collectively stored in the set of one or more computer-readable storage media, for causing a processor set to perform computer operations comprising:

receiving a natural language input via a software application;

executing a machine learning model on the natural language input to determine a plurality of sub-queries corresponding to the natural language input;

searching a tree structure for field values that correspond to the plurality of sub-queries and relationships between the field values, wherein the searching comprises searching a plurality of layers of the tree structure and identifying a plurality of query attributes for a structured query language (SQL) command, respectively, and executing a Monte Carlo Tree Search (MCTS) on the tree structure starting from a root node of the tree structure to decide a path in the tree structure which includes a child node that contains a greatest upper confidence bound;

generating the SQL command based on the field values and relationships between the field values, wherein the generating comprises generating the SQL command to include the plurality of query attributes; and executing the SQL command on a database to generate query results and return the query results to the software application.

16. The computer program product of claim 15, wherein the executing the machine learning model comprises determining hidden query content from the natural language input based on execution of the machine learning model and generating a sub-query which includes the hidden query content.

17. The computer program product of claim 15, wherein the searching comprises identifying tables to be queried from the database and at least one join operation to be performed on the tables, from the tree structure.

18. The computer program product of claim 15, wherein the searching comprises identifying an operation for the SQL command including at least one of an aggregate function, a Boolean function, and a numeric calculation, and column identifiers for the operation, from the tree structure.

19. The computer program product of claim 15, wherein the program instructions are further causing the processor set to perform:

retraining the machine learning model.

20. The computer program product of claim 19, wherein the machine learning model is retrained using at least the natural language input, the plurality of sub-queries and the SQL command.

* * * * *